Aug. 13, 1935. W. JOURDAN 2,011,247
METHOD OF COOKING
Filed Dec. 17, 1931 4 Sheets-Sheet 1

Aug. 13, 1935.  W. JOURDAN  2,011,247
METHOD OF COOKING
Filed Dec. 17, 1931  4 Sheets-Sheet 3

Witness
Harry P. L. White

Inventor
William Jourdan
By Edward Fay Wilson
atty.

Aug. 13, 1935.　　　W. JOURDAN　　　2,011,247
METHOD OF COOKING
Filed Dec. 17, 1931　　　4 Sheets-Sheet 4
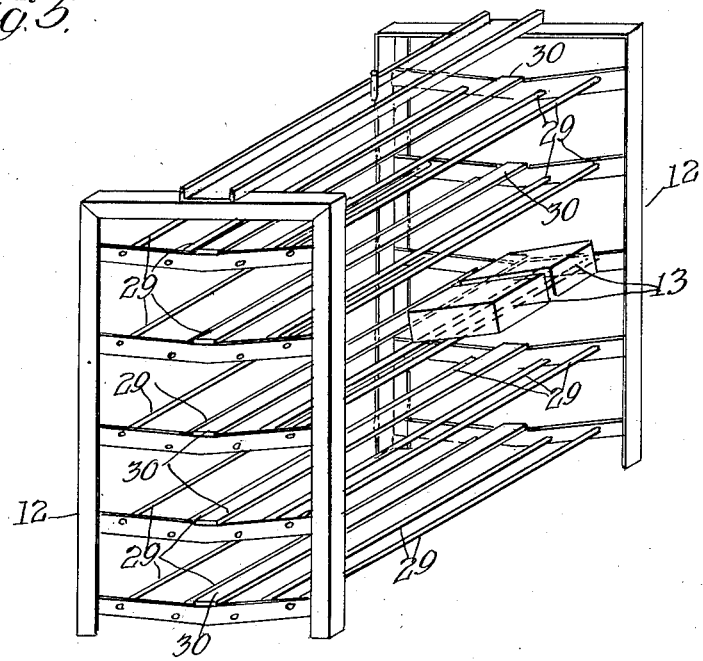
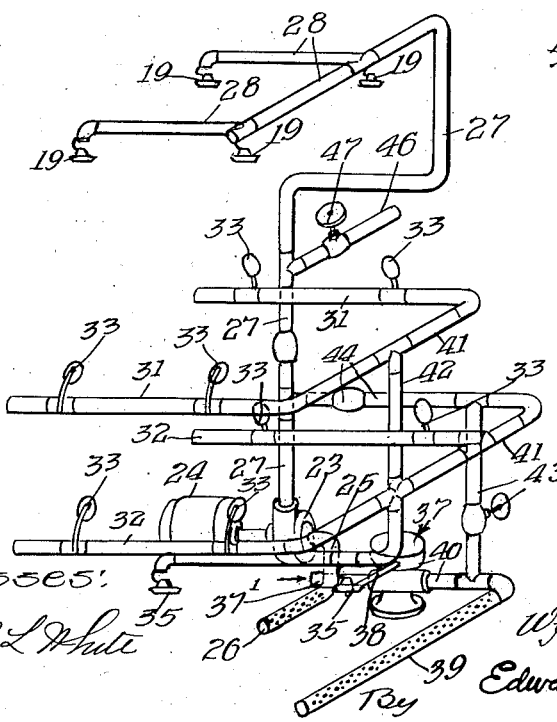

Patented Aug. 13, 1935

2,011,247

UNITED STATES PATENT OFFICE 2,011,247

METHOD OF COOKING

William Jourdan, Chicago, Ill.

Application December 17, 1931, Serial No. 581,652

1 Claim. (Cl. 99—11)

This invention relates to improved means and methods of cooking food products and especially meats.

In the method of cooking meat products disclosed in my co-pending application filed July 12, 1929, Serial No. 377,823, the products being cooked are surrounded by a hot water curtain and they are continuously douched or drenched with hot water.

Insofar as the method claimed herein was disclosed in my co-pending application supra, it is to that extent a continuation thereof.

This present invention is a further improvement in the general method disclosed in said application, the object being to more quickly bring the products, especially hams, to a more nearly equal cooking temperature, viz. approximately 165 degrees Fahrenheit and to more constantly maintain this desired temperature throughout the cabinet during the cooking period.

The hams or other meats to be cooked may be enclosed in metal containers which, in turn, are supported on racks capable of being quickly entered into or removed from the cabinet.

Hot water is applied to the contents of the cabinet from the top in the method disclosed in my application supra and, in addition, steam is supplied to the bottom of the cabinet and steam or hot water is projected into the containers from the sides of the cabinet in such a manner as to strike the outer ends and bottoms of the containers.

This additional application of steam especially at the bottom of the cabinet assists in quickly equalizing the temperature throughout the cabinet and the application of steam or hot water from the sides assists in quickly raising the temperature of the containers to the cooking temperature and the continued application of hot water from the sides helps to equalize the temperature of the contents of the containers so that the contents are more quickly and evenly cooked.

This method of cooking meats arranged in containers is a very great improvement over the old method of stacking the containers in open relation in a vat and circulating hot water in the vat. In this old method it is a practical impossibility to uniformly cook the contents of all of the containers as it is a practical impossibility to uniformly circulate the hot water about all of the containers. Furthermore, the exuded grease covers the containers and the flow of the water through the vat cannot be made strong enough to wash off this accumulation. On the other hand, in this present novel method, the containers are continuously washed by hot water flowing over them, all of the grease is washed down to the sump in the bottom of the cabinet when it can be readily gotten rid of.

The result is that the containers, when removed from the cabinet, are clean and the workmen in handling them and removing the contents do not discolor or disfigure the contents and the containers are immediately ready for use without going through a more or less long and expensive cleaning process.

The invention will be more readily understood from the following description and appended claim taken in conjunction with the accompanying four sheets of drawings illustrating the invention and forming part of this specification and in which drawings:—

Figure 1:
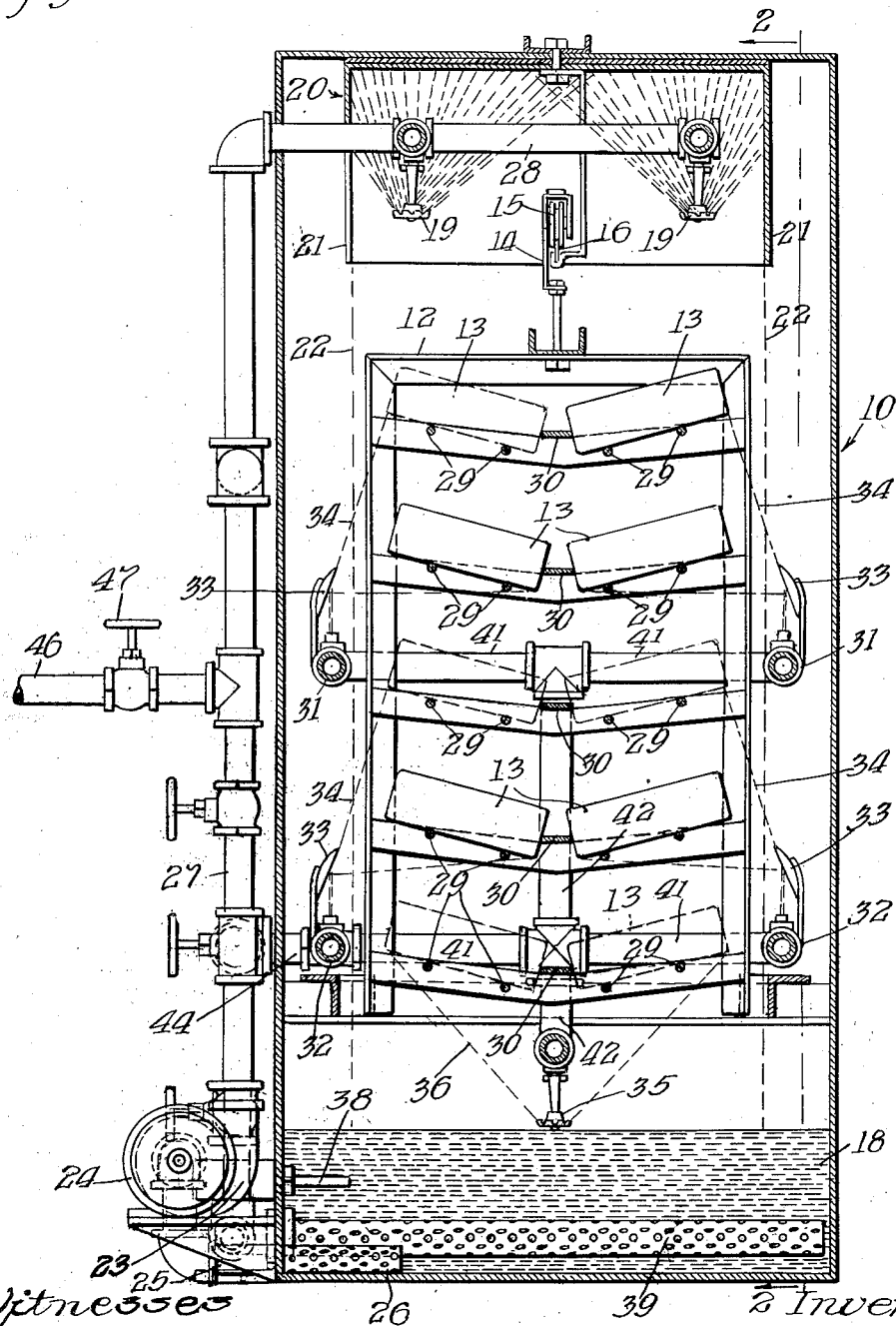
Fig. 1 is a vertical, sectional view of the cabinet and associated devices and including a similar view of a rack such as may be used in the cooking of meat, such as hams, in closed containers; the section being taken on the line 1—1 of Fig. 2.
Figure 2:
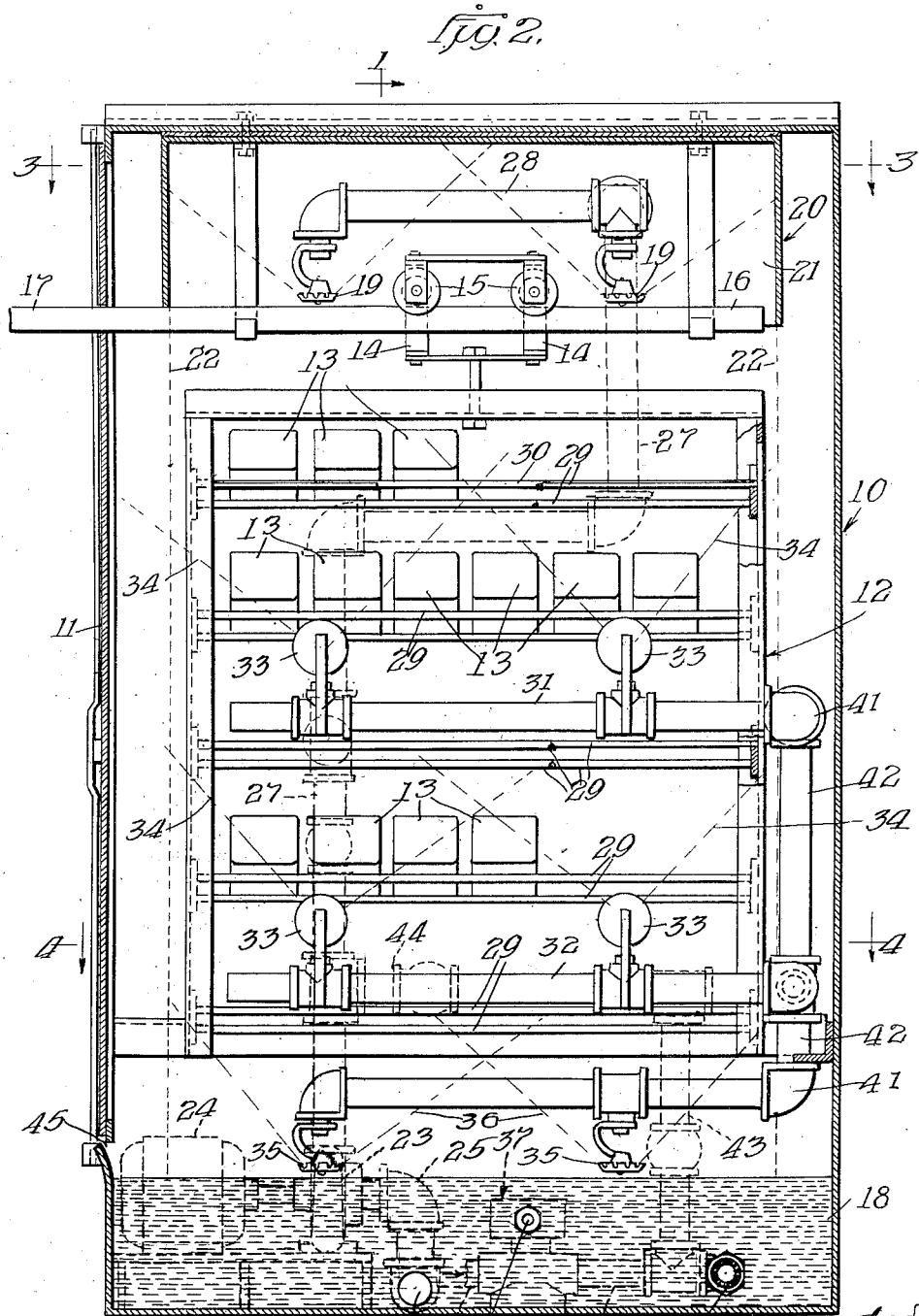
Fig. 2 is a vertical section on the line 2—2 of Fig. 1.
Figure 3:
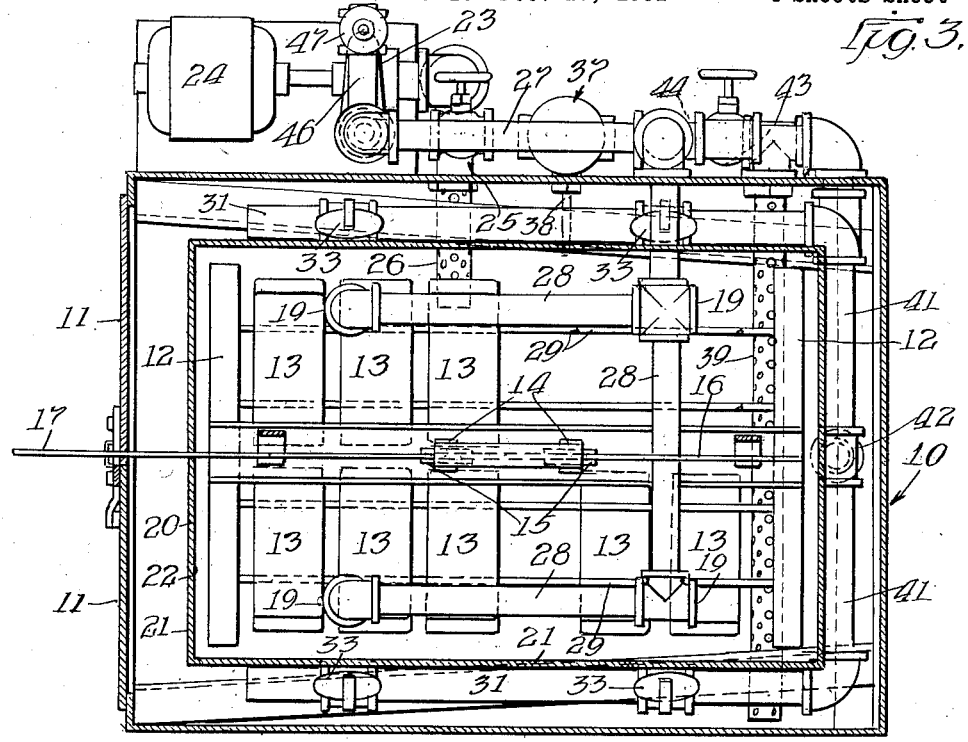
Figure 4:
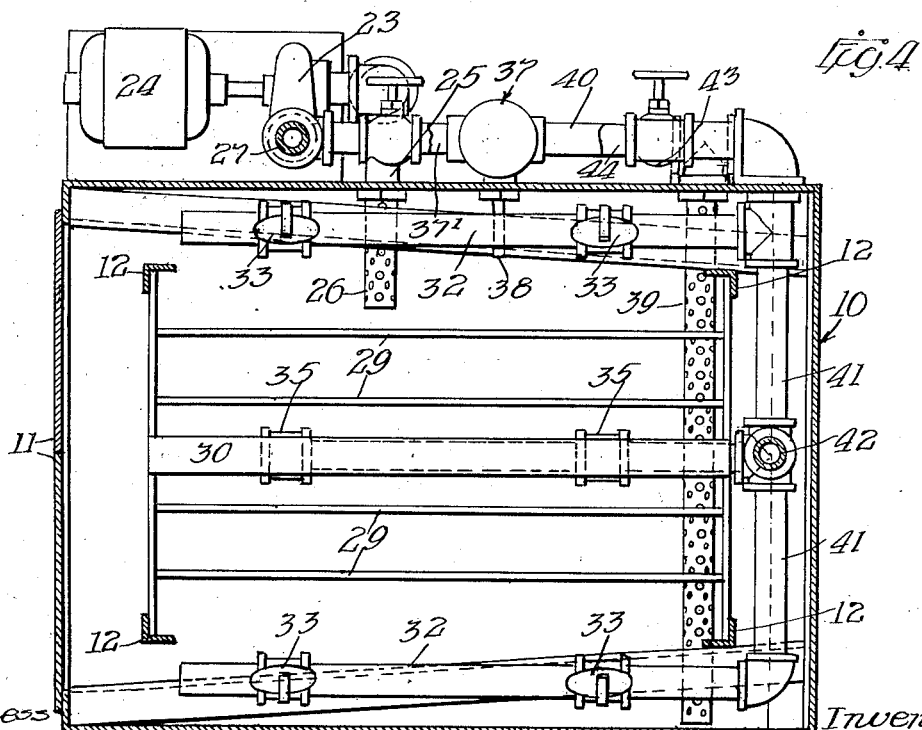

Figs. 3 and 4 are horizontal sections on the line 3—3 and 4—4, respectively, of Fig. 2;

Fig. 5 is a perspective view of the rack shown in Fig. 1; and

Fig. 6 is a perspective view of the discharge nozzles and pipe connections.

In said drawings, 10 illustrates a sheet metal cabinet of suitable proportions for containing the articles to be cooked and the means for discharging heated cooking fluid, viz. hot water or steam or both, upon the articles to be cooked.

The cabinet is closed at one end by doors 11 which may be opened for the entrance or withdrawal of a rack 12 suitably made for supporting the articles, either sausages hung upon smoke sticks in the usual manner or meats, such as hams, in metal containers as indicated at 13.

The rack 12 is suspended by hangers 14 and wheels 15 from a fixed track 16 which is a continuation of an outer track 17 outside of the cabinet. The rack with its load can thus be easily placed in the cabinet or withdrawn from the cabinet when the doors 11 are open.

The cabinet is provided at its bottom below the doors 11 with a sump 18 in which the hot water used in the cooking collects and from which it is drawn to be circulated through the cabinet.

For the purpose of applying the hot water to the products to be cooked, discharge nozzles 19 are arranged near the top of the cabinet and adapted to discharge the hot water upwardly toward the top of the cabinet in a heavy spray. In the top of the cabinet is fixed a hood 20 open at its bottom and into which the nozzles 19 discharge the hot water. The hood has depending walls 21 substantially parallel with the side walls of the cabinet and adapted to cause some of the discharged hot water to fall in curtains of drops as indicated at 22. Other drops are deflected from the hood upon the products upon the rack. The drops being deflected by the top and walls of the hood strike the products at indeterminate points. In other words, streams emitted by the nozzles are not projected directly against the products but indirectly by the hood.

The nozzles 19 at the top of the cabinet are supplied with hot water from the sump by means of a pump 23 which may be operated by an electric motor 24. The suction pipe 25 of the pump enters through a side wall of the cabinet into the sump 18 as shown at 26, and the delivery pipe 27 rises to the top of the cabinet and is connected to the nozzles 19 by branch pipes 28.

As shown, the containers 13 rest on rods 29 in inwardly inclined positions, their inner ends resting against spacer bars 30. The layers of containers are spaced apart vertically providing spaces between them.

The water which falls on the containers from the hood 20 falls down on to the tops of the containers and flows down to their inner ends and down over the inner ends of the containers and so down to the sump. By this means the tops and inner ends are continuously washed with a flow of hot water.

Other delivery nozzles are provided at the sides of the cabinet for projecting either steam or hot water against the bottoms and outer ends of the containers.

The delivery nozzles at the sides consist of an upper tier 31 and a lower tier 32. These nozzles carry deflectors 33 adapted to project the hot cooking medium, either steam or hot water, in a fan-like spray upwardly and inwardly as best shown at 34, against the outer ends and bottoms of the containers 13 thereby, when hot water is projected continuously flowing over the outer ends and bottoms of the containers and equalizing the application of heat to the containers over substantially the whole area thereof.

Additional discharge nozzles 35 arranged in the bottom of the cabinet just above the usual level of water discharge upwardly as shown at 36, against the products to be cooked. The nozzles 31, 32 and 35 are arranged to discharge either steam or hot water as may be desired at different stages of the cooking.

For the purpose of automatically controlling the temperature of the hot water in the sump and which is supplied to the nozzles, there is provided a thermostatically controlled valve 37 on a steam supply pipe 37'. There is a thermostatic device 38 which projects into the sump and which operates to control the supply of steam to the water in the sump by means of the valve 37. The steam is supplied to the sump through a supply pipe 39 connected to the delivery end of the valve 37 by a pipe 40.

The side nozzles of each tier are connected together by horizontal pipes 41 and the two tiers are connected together by a vertical pipe 42. This pipe 42 is also connected to the bottom nozzles 35. This delivery system is connected to the delivery steam pipe 40 by a valve controlled pipe 43 and also to the hot water delivery pipe 27 from the pump by a valve controlled pipe 44. By this means either steam or hot water can be delivered to all the lower nozzles.

Preferably, the racks loaded with the products to be cooked are delivered into the cabinet almost directly from the smoke ovens so that when the cooking operation begins, the products are nearly, if not quite up to, the cooking temperature. At other times it is more convenient to load the cabinet with products, such as hams or other meat products, which are much cooler, that is, at room temperature. This is usually about 100 degrees Fahrenheit below the desired cooking temperature and one important feature of the invention is the speed of heating the products to cooking temperature in a very short time.

The automatic temperature control maintains the water in the sump at the desired temperature, say substantially 165 degrees Fahrenheit. As soon as a rack is placed in the cabinet and the pump is started to deliver hot water to the nozzles at the top, this water is cooled in its descent and cools the water in the sump and the automatic control admits steam to heat the water.

At this time, preferably, the hot water valve controlling the pipe 44 is closed and the steam valve controlling the pipe 43 is open, thus, at the same time, supplying steam to the lower nozzles. This steam assists the hot water discharge through the top nozzles 19 in quickly raising the temperature of the whole contents of the cabinet to the desired cooking temperature.

During the process of removing one rack and entering another, the surrounding atmosphere enters the cabinet and as this is at room temperature, it hinders to some extent the raising of the temperature of the cabinet contents to cooking temperature and is the greatest hindrance to the uniform heating of the cabinet.

To assist in this step, I provide escape openings 45 in the front wall of the cabinet above and near to the normal water level in the sump. The air being cooler than the steam or water vapor admitted, sinks to the bottom and quickly escapes from the cabinet and thereafter the hot watery vapors completely fill the cabinet and completely envelop the contents. As soon as the contents reach substantially the cooking temperature, the supply of steam to the lower nozzles can be shut off and hot water supplied to them. The contents have now been raised to cooking temperature, they are surrounded by hot water curtains and they continue to be drenched with hot water from above and bombarded with hot water from below.

The result is that the contents are cooked to the extent desired and the whole contents of the cabinet are uniformly cooked and the contents of each casing are uniformly cooked.

The control of the cooking conditions is so easy and perfect that the resultant cooked products are of the highest quality so far as the cooking is concerned.

A fresh water supply pipe 46 is connected to the pump delivery pipe 27 and controlled by a hand valve 47.

At the end of the cooking period, if desired, the pump can be stopped and fresh cooler water supplied through the pipe 46 to the top nozzles for quickly cooling the products at least a few degrees before they are removed from the cabinet.

As many modifications of the invention will readily suggest themselves to one skilled in the art, I do not limit or confine the invention to the exact sequence of steps or the specific constructions herein shown and described.

I claim:

The herein described method of cooking food products which consist in arranging the products in a closed cabinet having a quantity of hot water below the products, maintaining the hot water at a suitable cooking temperature, withdrawing the hot water and projecting it over the products from the top, projecting hot water vapor into the lower part of the cabinet, and forcing the air to escape from the lower end of the cabinet, and equalizing the temperature of the contents of the cabinet, and then projecting hot water against the products from beneath and continuing the process until the products are properly cooked.

WILLIAM JOURDAN.